(12) United States Patent
Strong (10) Patent No.: US 12,463,686 B2
(45) Date of Patent: Nov. 4, 2025

(54) INTERFERENCE REDUCTION AT A WIRELESS STATION COMPRISING A MULTI-ELEMENT ANTENNA ARRAY

(71) Applicant: Cambium Networks Ltd, Ashburton (GB)

(72) Inventor: Peter Strong, Ashburton (GB)

(73) Assignee: Cambium Networks Ltd, Ashburton (GB)

( * ) Notice: Subject to any disclaimer, the term of this patent is extended or adjusted under 35 U.S.C. 154(b) by 0 days.

(21) Appl. No.: 18/674,381

(22) Filed: May 24, 2024

(65) Prior Publication Data

US 2024/0396595 A1    Nov. 28, 2024

(30) Foreign Application Priority Data

May 25, 2023 (GB) ...................................... 2307812

(51) Int. Cl.
*H04B 7/0426* (2017.01)
*H04B 7/06* (2006.01)
*H04B 7/08* (2006.01)

(52) U.S. Cl.
CPC ............. *H04B 7/043* (2013.01); *H04B 7/066* (2013.01); *H04B 7/0857* (2013.01)

(58) Field of Classification Search
CPC ...... H04B 7/043; H04B 7/066; H04B 7/0857; H04B 7/086; H04B 7/0617; H04B 7/0413;

(Continued)

(56) References Cited

U.S. PATENT DOCUMENTS

| | | | |
|---|---|---|---|
| 2003/0034921 A1* | 2/2003 | Chang | H01Q 1/38 343/872 |
| 2006/0153283 A1* | 7/2006 | Scharf | H04B 1/7107 375/136 |

(Continued)

FOREIGN PATENT DOCUMENTS

EP    2 575 274 A1    4/2013

OTHER PUBLICATIONS

Extended European Search Report for EP Application No. 24177806.7 dated Oct. 25, 2025 (12 pp.).

(Continued)

*Primary Examiner* — Vineeta S Panwalkar
(74) *Attorney, Agent, or Firm* — Crowell & Moring LLP (57) ABSTRACT

A first wanted signal beam is formed at a multi-element antenna array to receive a first wanted signal having a first and second sub-carrier, each having known transmitted modulation, and the subcarriers are combined using a first linear relationship determined to reduce a component of the wanted signal. A first orthogonal beam is formed that is orthogonal to the first wanted signal beam, and a first subcarrier received in the first orthogonal beam corresponding in frequency to the first subcarrier of the first wanted signal is combined, using the first linear relationship, with a second subcarrier received in the first orthogonal beam corresponding in frequency to the second subcarrier of the first wanted signal. The linear combinations are processed to generate weights, which are applied to interference received in the first orthogonal beam to produce weighted interference which is combined with the received first wanted signal to reduce interference.

20 Claims, 10 Drawing Sheets

(58) Field of Classification Search
CPC ... H04B 7/0452; H04B 7/0456; H01Q 3/2611
See application file for complete search history.

(56) References Cited

U.S. PATENT DOCUMENTS

| | | |
|---|---|---|
| 2008/0014876 A1 | 1/2008 | Heikkila et al. |
| 2008/0293371 A1 | 11/2008 | Kishigami et al. |
| 2015/0249517 A1 | 9/2015 | Seo et al. |
| 2021/0075484 A1 | 3/2021 | Jamin et al. |

OTHER PUBLICATIONS

Combined Search and Examination Report for GB Application No. 2307812.4 dated Dec. 1, 2023 (7 pages).
Kress, Bernard C., "Optical Architectures for Augmented-Virtual-, and Mixed-Reality Headsets," https://www.spiedigitallibrary.org/eBooks/PM/optical-architectures-for-augmented—virtual—and-mixed-reality/eISBN-9781510634344/10.1117/3.2559304 (274 pp) [uploaded in three parts due to document size].

* cited by examiner

INTERFERENCE REDUCTION AT A WIRELESS STATION COMPRISING A MULTI-ELEMENT ANTENNA ARRAY

CROSS-REFERENCE TO RELATED APPLICATION

This application claims priority to Great Britain Patent Application No. 2307812.4, filed on May 25, 2023, the entirety of which is hereby fully incorporated by reference herein.

TECHNICAL FIELD

The present invention relates generally to interference reduction at a wireless station having a multi-element antenna array, and more specifically, but not exclusively, to interference reduction at a wireless station in a fixed wireless access network.

BACKGROUND

Modern wireless systems are required to operate in an increasingly congested spectrum, in which interference to signals received by a wireless station may be expected from transmissions from other wireless stations operating within a frequency band and from various sources of spurious emissions. In order to provide reliable operation and increased capacity, it is desirable to reduce the received interference at a wireless station. In an example, interference may be received at an access point or base station of a fixed wireless access network operating a single user MIMO or multi-user MIMO (MU-MIMO) scheme, and also at a subscriber module, that is to say user equipment or outstation. It may be possible to form a beam to reduce interference received at a wireless station based on samples of interference taken when a wanted signal is absent. However, providing time and/or frequency resource in which the wanted signal is absent may reduce data capacity. Furthermore, it may be challenging to reduce interference which may be characterised as dynamic and/or random, which may change from symbol to symbol in a received waveform in an unpredictable way.

SUMMARY

In accordance with a first aspect of the present invention, there is provided a method of reducing interference at a wireless station comprising a multi-element antenna array, the method comprising:

receiving interference and at least a first wanted signal comprising sub-carriers at the multi-element antenna array;

forming a first wanted signal beam to receive the first wanted signal;

receiving, using the first wanted signal beam, a first sub-carrier and at least a second sub-carrier of the first wanted signal, each having known transmitted modulation;

generating a first linear combination, the first linear combination being a combination of the received first sub-carrier and at least the received second sub-carrier of the first wanted signal, the first linear combination using a first linear relationship between subcarriers, the first linear relationship being determined to reduce a component of the wanted signal in the first linear combination;

forming a first orthogonal beam orthogonal to the first wanted signal beam;

generating a second linear combination, the second linear combination being a combination of a first subcarrier received in the first orthogonal beam corresponding in frequency to the first subcarrier of the first wanted signal and at least a second respective subcarrier received in the first orthogonal beam corresponding in frequency to the second subcarrier of the first wanted signal, the second linear combination using the first linear relationship;

processing at least the first and second linear combinations to generate one or more weights; and applying the one or more weights to interference received in the beam orthogonal to the first wanted signal to produce weighted interference and combining the weighted interference with the received first wanted signal to reduce interference to the first wanted signal.

This allows efficient generation of weights, in the presence of a wanted signal, for cancellation of interference. In particular, this allows at least the first sub-carrier of the wanted signal to be energised and to be used as a pilot tone for use in decoding received symbols, as opposed to being left un-energised to allow for the measurement of interference in the first sub-carrier position. The linear combination of the first and second subcarriers in which the wanted signal is reduced or cancelled can be used in a process of generating weights for cancelling interference as a substitute for using a direct measure of interference on the first subcarrier. For example, the relative phase and amplitudes of the linear combination of first and second sub-carriers in the wanted beam relative to the relative phase and amplitudes of the linear combination of first and second sub-carriers in the orthogonal beam and/or beams can be used to generate weights to apply to the outputs of the respective beamformers to cancel the interference. This is instead of using the relative phase and amplitude of a direct measurements of interference in the position of the first sub-carrier. If the first subcarrier were not energised, then it would be possible to simply measure a signal received in its place and assume that the measured signal is an interference signal. However, if the first subcarrier were energised, this would not be possible. Instead of using the direct measurement of an interference signal, the result of the linear combination of the interference from two subcarriers is used, in which the linear combination has substantially nulled the wanted signal. This allows the linear combinations to be used instead of a direct measurement of interference signal in the process of generating the weights. For example, the linear combinations can be used to form an interference covariance matrix. Furthermore, the generated weights may be generated from estimates from sub-carriers of a single symbol, or from a small number of symbols, allowing reduction of interference that may change from symbol to symbol.

In an example, the method comprises generating the linear combination of the received first sub-carrier and at least the received second sub-carrier by normalisation of the first and at least the second received sub-carriers with respect to the known respective transmitted modulation.

This allows the first and at least the second received subcarriers to be shifted in phase and/or amplitude to the same nominal modulation state, so that the wanted signal components of the first received subcarrier can be removed by a linear combination process comprising subtraction. Normalisation counteracts the effect of the modulation of the first and second subcarriers, so that the first and second subcarriers are brought to the same nominal modulation state. This allows prior knowledge of the relative transmitted modulation between sub-carriers to be used to provide efficient cancellation of an estimate of the wanted signal component of the first sub-carrier. This has the advantage that it is not required to know the absolute magnitude and phase of the sub-carriers, only the relative magnitude and phase and so the wanted component can be nulled using a linear combination even if the sub-carriers are masked by interference. In an example, it may be assumed that the first and second subcarrier have experienced substantially the same channel response.

In an example the method comprises generating the linear combination of the received first sub-carrier and at least the received second sub-carrier by subtracting a linear combination of the normalised second and at least a normalised third received sub-carrier from the normalised first received subcarrier.

This allows an improved estimate of the wanted signal component of the first subcarrier and so an improved estimate of the linear combination of interference components when the estimated wanted signal is subtracted.

In an example, the method comprises generating the one or more weights by a process comprising forming a least squares linear predictor of the first linear combination using the second linear combination This allows one or more weight to be generated for use in a beamformer to weight the corresponding received interference components of the signals received in the one or more orthogonal beams to cancel or reduce the interference.

In an example, the method comprises forming a plurality of beams orthogonal to the first wanted signal beam and wherein forming the least squares linear predictor comprises:
    forming a covariance matrix from linear combinations having the first linear relationship of components comprising received interference components of the signals received in the plurality of beams orthogonal to the first wanted signal beam corresponding to the first subcarrier;
    forming a cross-correlation vector of the linear combination of the interference component of the received first subcarrier and the corresponding linear combinations of received interference components of the signals received in the plurality of beams orthogonal to the first wanted signal; and
    dividing the cross-correlation vector by the covariance matrix.

This allows efficient formation of the beams orthogonal to the first wanted signal.

In an example, the method comprises forming the first wanted signal beam from channel estimates derived from a plurality of sounding operations which are processed to remove or de-weight measurements which deviate from an expected result.

This allows a more accurate wanted signal beam to be generated.

In an example, the method comprises forming the plurality of beams orthogonal to the first wanted beam by a process comprising using the channel estimates.

This allows the plurality of beams orthogonal to the first wanted beam to be formed efficiently.

In an example, forming orthogonal beams to the first wanted signal beam of a plurality of wanted signal beams comprises a method selected from a Gram-Schmidt procedure, a modified Gram-Schmidt procedure and QR decomposition.

This allows the orthogonal beams to be formed efficiently.

In an example, the first wanted signal is an Orthogonal Frequency Division Modulation OFDM signal and the first sub-carrier and at least the second sub-carrier are pilot tones of the OFDM signal having known transmitted amplitude and phase modulation.

In an example, the multi-element antenna array comprises a first dual-polar antenna element and a second dual-polar antenna element disposed as a row of only two antenna elements, wherein the array of antenna elements is disposed as a feed for a reflector of an antenna arrangement.

This allows for efficient reduction in interference with a cost-effective antenna array having only two elements, while providing gain using the reflector of the antenna arrangement.

In an example, the antenna array consists of only the first and second dual-polar elements, arranged as only one row.

In an example, the antenna array comprises a third and fourth dual-polar antenna element disposed to form a second row of only two antenna elements, the second row being parallel to the row consisting of the first and second dual polar antenna elements, wherein each row is configured to be disposed at an angle of 30-60 degrees from horizontal.

This provides additional degrees of freedom, at least in azimuth, to allow cancellation of interference.

In an example, the angle is substantially pi/4 radians.

In an example, the antenna arrangement is an offset Gregorian antenna arrangement and the feed is for a secondary reflector of the offset Gregorian antenna arrangement.

In accordance with a second aspect of the invention, there is provided a wireless station comprising:
    a multi-element antenna array; and one or more processors configured to cause the wireless station to reduce interference at a wireless station comprising a multi-element antenna array, by:
    receiving interference and at least a first wanted signal comprising sub-carriers at the multi-element antenna array;
    forming a first wanted signal beam to receive the first wanted signal;
    receiving, using the first wanted signal beam, a first sub-carrier and at least a second sub-carrier of the first wanted signal, each having known transmitted modulation;
    generating a first linear combination, the first linear combination being a combination of the received first sub-carrier and at least the received second sub-carrier of the first wanted signal, the first linear combination using a first linear relationship between subcarriers, the first linear relationship being determined to reduce a component of the wanted signal in the first linear combination;
    forming a first orthogonal beam orthogonal to the first wanted signal beam;
    generating a second linear combination, the second linear combination being a combination of a first subcarrier received in the first orthogonal beam corresponding in frequency to the first subcarrier of the first wanted signal and at least a second respective subcarrier received in the first orthogonal beam corresponding in frequency to the second subcarrier of the first wanted signal, the second linear combination using the first linear relationship;
    processing at least the first and second linear combinations to generate one or more weights; and
    applying the one or more weights to interference received in the beam orthogonal to the first wanted signal to produce weighted interference and combining the weighted interference with the received first wanted signal to reduce interference to the first wanted signal.

In accordance with a third aspect to the invention, there is provided a non-transitory storage medium carrying instructions, which, when executed by one or more processors, cause a wireless station to perform the claimed method.

Further features and advantages of the invention will be apparent from the following description of preferred embodiments of the invention, which are given by way of example only.

DETAILED DESCRIPTION

By way of example, embodiments of the invention will now be described in the context of a fixed wireless access network comprising an access point, typically mounted on an antenna tower, and a number of subscriber modules, in communication with the access point, typically installed at fixed positions at a user's premises, for example mounted to an external wall or roof of a building. In example, radio signals are transmitted at approximately 5 GHz and in another example, radio signals are transmitted at approximately 28 GHz. However, it will be understood that embodiments are not limited to the examples described, and may apply to other types of wireless networks, and to other frequencies of radio transmissions, which may be less than 5 GHz, between 5 GHz and 28 GHz, or greater than 28 GHz.

In an example, the fixed wireless access network operates a single user multiple Input Multiple Output (MIMO) or multi-user MIMO (MU-MIMO) scheme, in which the access point may steer beams for communication with one or more subscriber modules at a given time. Signals are transmitted using Orthogonal Frequency Division Modulation (OFDM), in which symbols comprise some subcarriers allocated for data transmission and other subcarriers allocated as pilot tones. The pilot tones are sub-carriers which are transmitted with a modulation state that is known in advance to the receiver, to provide a reference for the decoding of the subcarriers carrying data. The subcarriers may be used for channel sounding, to provide a measurement of propagation characteristics in a channel between the access point and a subscriber module.

Figure 1:
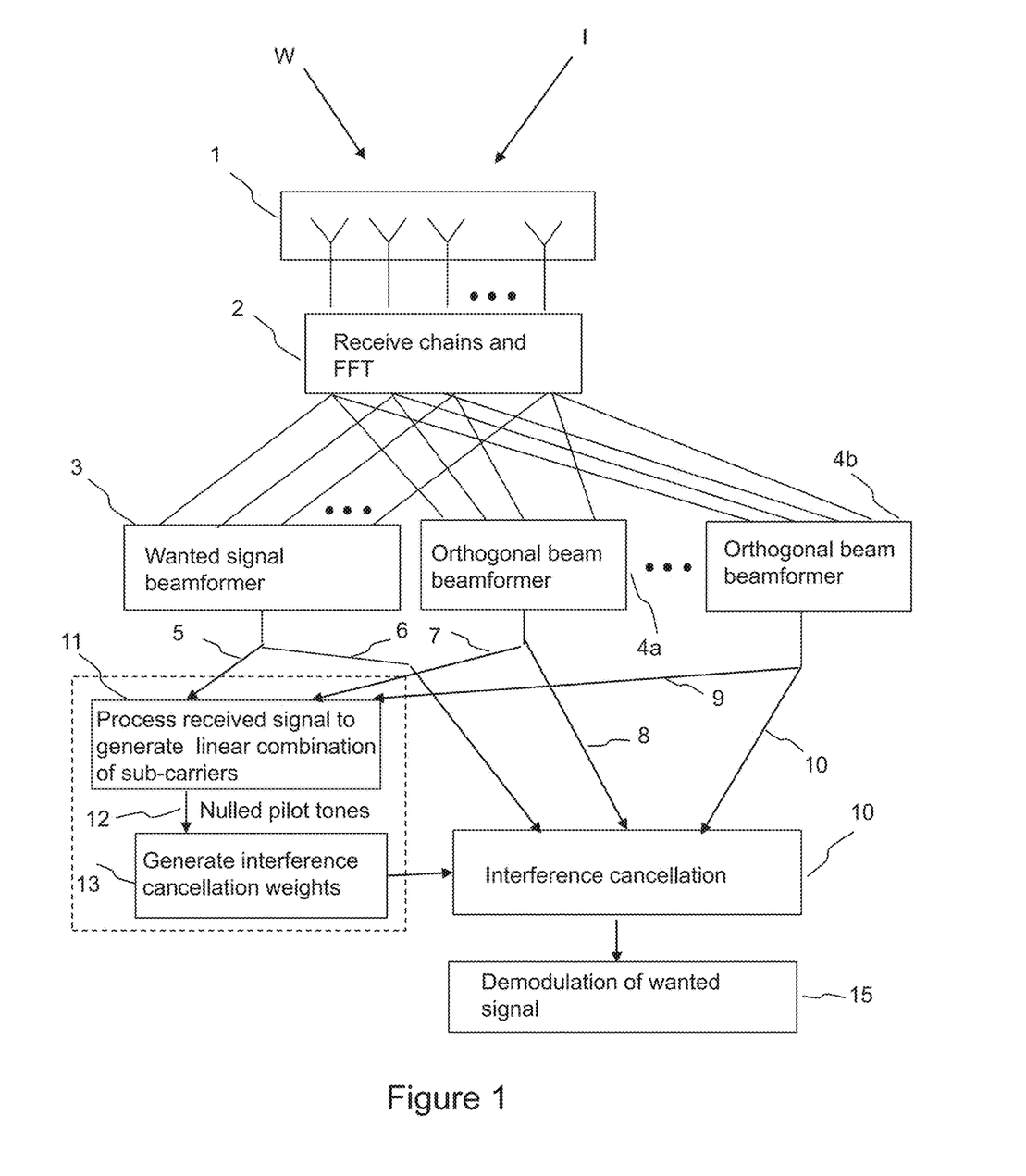
FIG. 1 is a schematic diagram showing a receiver architecture in an example.

FIG. 1 is a schematic diagram showing a receiver architecture in a wireless station as an example. The wireless station may be, for example, an access point or a subscriber module. The example of an access point will be described.

As shown, a wanted signal W is received at multi-element antenna array 1 at the access point. The multi-element array is in this example, an array of patch radiator elements. The wanted signal in this example is a transmission from a subscriber module. In interference signal I is also received, typically from a different angle of arrival than that of the wanted signal. The interference may originate from another wireless network or from some source of spurious emission, for example.

Signals received at each element of the multi-element antenna array are processed by the receive chains and Fast Fourier Transform (FFT) 2. For each element, the received signal is downconverted in frequency from the received radio frequency, which may be approximately 5 GHz in this example, to baseband. At baseband, each received signal is transformed from the time domain to the frequency domain by a Fourier transform, typically using a Fast Fourier Transform algorithm. The resulting frequency domain information gives inphase and quadrature components for each subcarrier. The wanted signal in this example is an OFDM comprising sub-carriers, some of the subcarriers carrying payload data and some being used as pilot tones having a known modulation state.

The inphase and quadrature components of each subcarrier are passed to a wanted signal beamformer 3, for forming beams towards the subscriber module in this example, and also to one or more orthogonal beam beamformers 4a, 4b, which form respective beams which are orthogonal to the wanted signal beam. Because the beams are orthogonal to the wanted signal beam, the wanted signal is cancelled in the orthogonal beams.

In the wanted signal beamformer 3, corresponding received subcarriers for each antenna element are weighted and combined to form a beam towards the subscriber module from which the symbol is received. The weights for the wanted signal beamformer in this example are calculated on the basis of channel sounding to measure the propagation characteristics of the channel, and the weights are calculated such that the signals from the subscriber module reinforce when combined. The measurements of propagation characteristics of the channel may be prior measurements, taken, for example, a second or more before the wanted signal is received in which interference is to be cancelled. This is possible because the wanted signal channel may have a long coherence time, that is to say that it may not change quickly. This is particularly likely to be true in the case of fixed wireless access systems.

In the orthogonal beam beamformer(s) 4a, 4b, corresponding received subcarriers for each antenna element are weighted and combined to form a respective beam that is orthogonal to the wanted signal beam and any further wanted signal beams. There can be multiple wanted signal beams, either because there are multiple users or because even with a single user there may be spatial multiplexing. The weights for the orthogonal beam beamformer(s) in this example are calculated on the basis of the channel estimates derived from channel sounding, and a Gram-Schmidt procedure, a modified Gram-Schmidt procedure or a QR decomposition procedure. The orthogonal beam beamformer(s) may be referred to as interference beamformers, and the orthogonal beams to the wanted signal beam or beams may be referred to as interference beams, because they are configured not to receive wanted signal(s).

As shown in the example of FIG. 1, pilot tones 5 in the received wanted signal, are processed 11 to produce nulled pilot tones 12. In this process, one or more subcarriers that are allocated as pilot tones, having a known transmitted modulation, are processed to remove an estimate of the wanted signal component. This is done by using a linear combination of several pilot tones, each of which is normalised with respect to the known transmitted modulation. That is to say that the known transmitted modulation is counteracted so that each normalised pilot tone has the same nominal modulation state. In this way, the linear combination can be arranged to subtract the estimated wanted signal from a pilot tone, using the normalised values of one or more other pilot tones, leaving an interference estimate for the respective pilot tone. If the linear combination of more than one other pilot tone, appropriately weighted in magnitude, is used for the subtraction, then the interference components of the other pilots tones in combination is reduced and the estimate of the interference component in the respective pilot tone is improved. The subcarriers received in the orthogonal beam beamformer(s) that correspond to the nulled pilot tones in the wanted signal beamformer are also used to produce linear combinations of subcarriers, using the same linear relationship as was used to produce the linear combination in the nulled plot tones.

The linear combinations of the respective pilot tone subcarriers are processed, together with corresponding linear combinations of subcarriers 7, 9 received by the orthogonal beam beamformers or beamformers, to generate 13 one or more weights for interference cancellation, for use in an interference cancellation module 10. The one or more weights for interference cancellation may by generated a process comprising forming a least squares linear predictor of the estimate of the calculated linear combination of interference components for a respective pilot tone subcarrier using a corresponding calculation of linear combinations of received interference components of the signals received in the one or more beams orthogonal to the wanted signal beam. Forming the least squares linear predictor may comprise forming a covariance matrix from components comprising the calculated linear combinations of received interference components of the signals received in the beams orthogonal to the first wanted signal beam corresponding to the first subcarrier, forming a cross-correlation vector of the calculated linear combination of interference components of a respective pilot tone subcarrier and the corresponding calculated linear combinations of received interference components of the signals received in the plurality of interference beams, and dividing the cross-correlation vector by the covariance matrix, or multiplying by the inverse of the covariance matrix.

As shown in FIG. 1, in the interference cancellation module 10, the one or more weights for interference cancellation are applied to signals 6, 8, 10, which comprise interference, received in the one or more beams orthogonal to the first wanted signal to produce weighted interference. The weighted interference is combined with the received first wanted signal to reduce interference to the first wanted signal. The wanted signal symbol, having reduced interference, is demodulated 15 to produce output data. The demodulation process makes use of the pilot tones, which are not nulled in the wanted signal at the output of the interference cancellation module, to demodulate the sub-carriers carrying data, by providing an equaliser characteristic.

An advantage of nulling the pilot tones is that this improves the efficiency and accuracy of the process of generating the weights for interference cancellation, without impacting data capacity or demodulation accuracy. It is preferable to generate the weights for interference cancellation by taking samples of interference only, and not wanted signal, from the output of the wanted signal beamformer 3, and processing these samples of interference along with samples of interference from the outputs of the one or more orthogonal beam beamformers 4a, 4b, for example by a process comprising generating a covariance matrix. In the example described, linear combinations of interference samples from several subcarriers are used, instead of a direct measurement of interference on one subcarrier. An alternative method of obtaining samples of subcarriers in the wanted symbol having interference only and no wanted signal would be to suppress some of the subcarriers on transmission. However, this would impact either data capacity, or the number of pilot tones that could be transmitted, which may impact equalisation accuracy for receiving data. By nulling the wanted signal from pilot tone sub-carriers as described to produce linear combinations of interference samples from several subcarriers, data capacity and demodulation accuracy can be maintained.

As described, using the linear combination of the received first sub-carrier and at least the received second sub-carrier to reduce a component of the wanted signal in the linear combination allows weights to be generated by a process, such as a process comprising forming a least squares linear predictor, which would not operate efficiently in the presence of the wanted signal. This allows improved data capacity by allowing wanted signal symbols, including the pilot tone subcarriers having known transmitted modulation, to occupy the full time and frequency allocated to the symbol without the need to provide times and/or frequencies in which the wanted signal is known to be absent for the measurement of interference.

Figure 2:
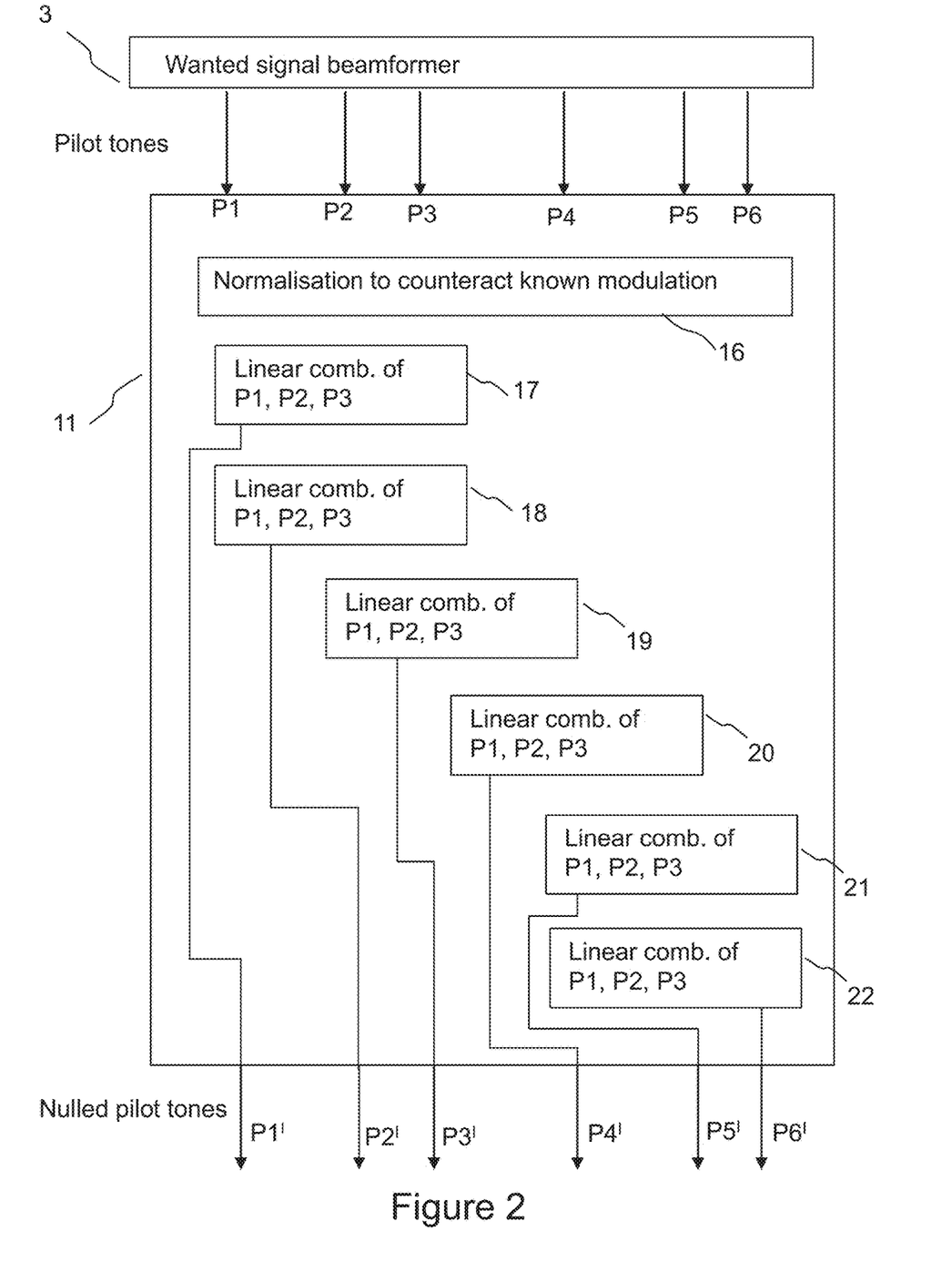
FIG. 2 is a schematic diagram showing signal processing functional blocks configured to null pilot tones.

FIG. 2 illustrates signal processing functional blocks configured to produce nulled pilot tone sub-carriers, that is to say linear combinations of subcarrier signals in which the wanted signal is reduced or cancelled. In this example, a symbol is output from the wanted signal beamformer 3, comprising sub-carriers in inphase and quadrature form, representing a phasor giving the amplitude and phase of the sub-carrier for that symbol. A sub-set of the subcarriers are designated as pilot tones sub-carriers, P1-P5. The subcarriers are normalised 16, to counteract known modulation so that each pilot tone has the same nominal modulation state. As shown, linear combinations of subsets of normalised subcarriers 17, 18, 19, 20, 21, 22 are produced to subtract the wanted signal estimate from each subcarrier. For example, half of the normalised values of each of P2 and P3 may be subtracted from the normalised value of P1. Nulled pilot tones, comprising linear combinations, which may be referred to as estimates related to the interference component, for the respective pilot tone sub-carriers PII-P6I are produced for use in generating interference cancellation weights.

Figure 3:
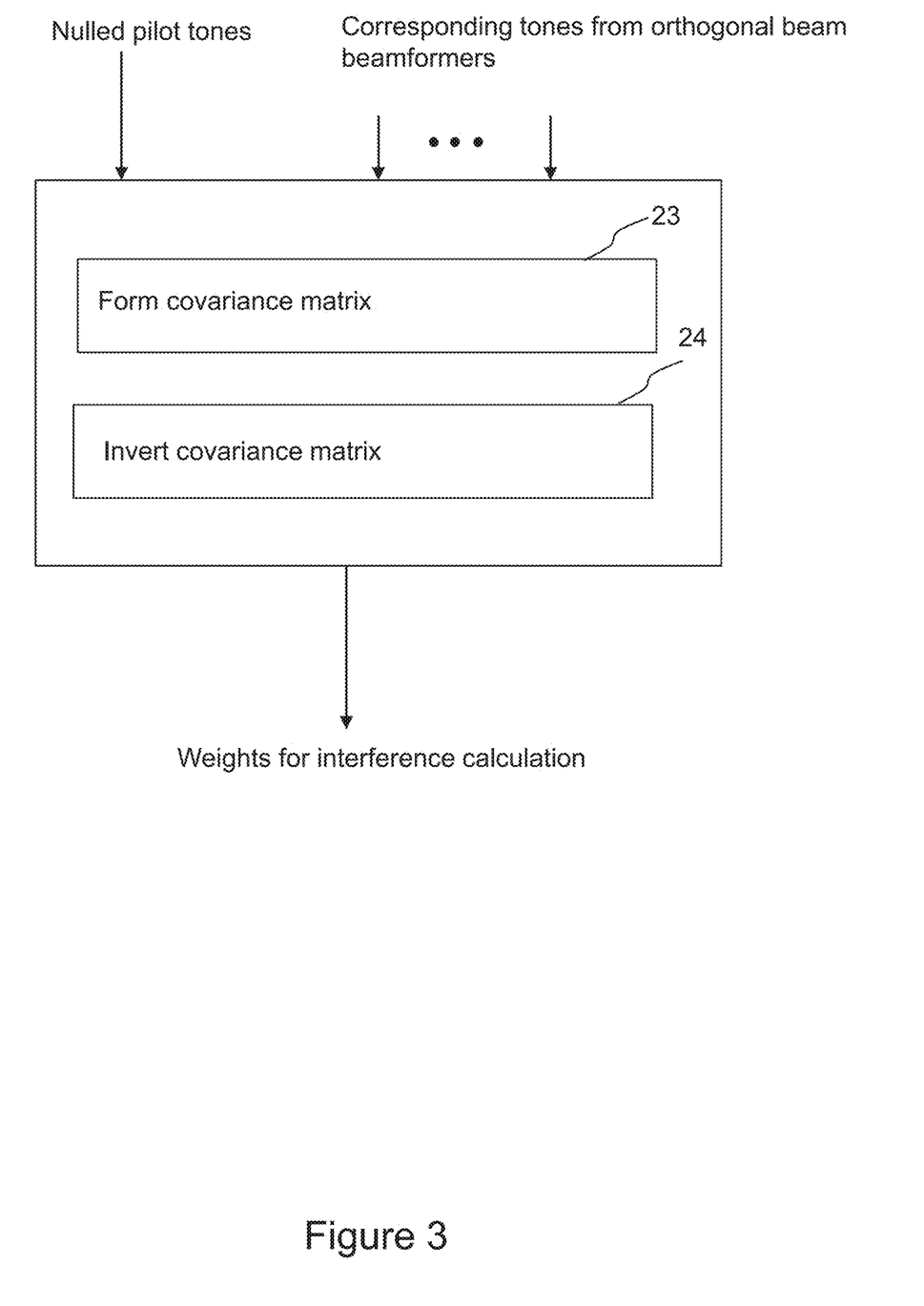
FIG. 3 is a schematic diagram showing signal processing functional blocks configured to generate weights for interference cancellation.

FIG. 3 is a schematic diagram showing signal processing functional blocks configured to generate weights for interference cancellation. As shown, a covariance matrix may be formed 23 using interference estimates, which may comprise the second linear combination, on nulled pilot tones and corresponding sub-carriers from the orthogonal beam beamformer or beamformers. The covariance matrix may be inverted 24, as part of the process of forming the least squares linear predictor. Forming the least squares linear predictor comprises forming a covariance matrix from components comprising received interference components of the signals received in the plurality of beams orthogonal to the first wanted signal beam corresponding to the first subcarrier, forming a cross-correlation vector of the interference component of the received first subcarrier and the corresponding received interference components of the signals received in the plurality of interference beams, and dividing the cross-correlation vector by the covariance matrix, which may be by multiplying the cross-correlation vector by an inverted covariance matrix, as part of the process of producing weights for interference cancellation.

Figure 4:
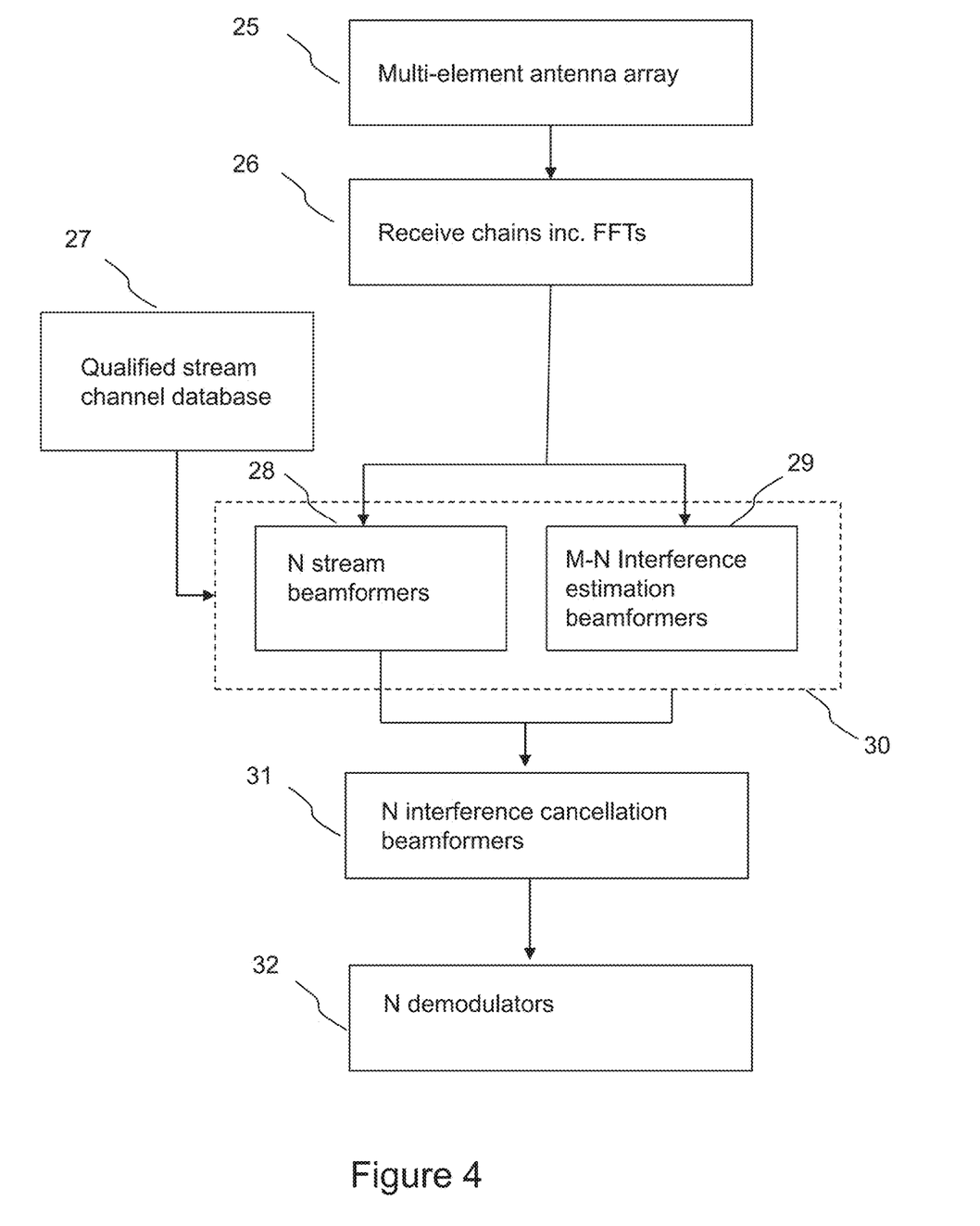
FIG. 4 is a schematic diagram illustrating a receiver architecture in an example.

FIG. 4 is a schematic diagram illustrating a receiver architecture in an example, showing shows a MIMO received (RX) signal receiver and demodulator with a dynamic interference cancellation capability. The RX signal is expected to be a transmission burst normally comprising one or more contiguous OFDM symbols. The RX signal may be associated with random dynamic interference. The received MIMO streams may arise from a single user (SU-MIMO) or multiple users (MU-MIMO).

The multi-element antenna array 25 provides RF signals to the Receive chains including FFTs 26, which provide M measurements for each subcarrier to the qualified stream channel database 27, the N stream beamformers (wanted signal beamformers) 28 and M-N interference estimation beamformers (orthogonal beam beamformers) 29.

The qualified stream channel database 27 is a database of qualified channel estimates for all potential streams. Qualified means the channel estimates have been subjected to some checking and are deemed to be valid and substantially uncorrupted by interference. Checking may have involved performing multiple sounding operations and rejecting or de-weighting measurements which deviate significantly from an expected result. Qualified stream channel estimates are updated continuously and the entries are kept current by updating the database as soon as newly qualified results allow. For links where the propagation channel exhibits long coherence times such as a line of sight, fixed wireless access link, it is expected that the channel estimates would be update relatively slowly, potentially slower than once per second. The stream channel estimates are used for the beamformers 28 and 29. They may also be used for scheduling decisions. They may not be sufficient for signal demodulation in the N demodulators 32 because of the slow update rate.

The N Stream beamformers (wanted signal beamformers) 28 separate the N streams from the receive chains 26 using the latest channel estimates provided by the qualified stream channel database 27. Weights may be calculated using a zero forcing or least mean squares process.

Weights may be calculated before the burst is received from estimates provided the stream channel database and deemed to be uncorrupted by interference. This allows weights to be precalculated relaxing calculation requirements, allows weights to be calculated using measurements deemed to be interference free. This also allows reducing pilots, i.e. pilot signal sub-carriers (reference signal) in the burst signal (with potential efficiency benefit) since the demodulator does not need to recover a full channel estimate from the pilots in the burst. As a result the system may be configured so as not to recover the full channel estimate from the transmission burst, due to insufficient pilot tones to do this pilots.

Beamformer weights may persist for the duration of the data burst. Typically provision is made to calculate new weights for each burst because the scheduled streams change from burst to burst. In the uplink of a point to multipoint system, that is to say a system with more than one subscriber module in communication with an access point, the system transmissions would be scheduled from different users in consecutive bursts.

The M-N Interference estimation beamformers 29 provide M-N interference estimates taking into account which N streams have been scheduled and using the channel estimates provided by the qualified stream channel database 27.

The M-N interference cancellation beamformers (orthogonal beam beamformers) 29 are orthogonal to the N stream beamformers 28. Various methods may be used for calculating the weights for these M-N beamformers including the Gram-Schmidt procedure, the modified Gram-Schmidt procedure and QR decomposition.

Interference estimation weights persist for the duration of the data burst. As with the N steam beamformers 28, typically provision would be made to calculate new weights for each burst because the scheduled streams could change from burst to burst.

The N Interference cancellation beamformers (interference cancellation modules) 31, after reception of the transmission burst, for each of the N signals from the N stream beamformer 28, using the M-N signals from the M-N interference estimation beamformers 29, a set of N interference cancellation weights is estimated and then applied to the M-N signals from the M-N interference estimation beamformers 29 to cancel the interference present in the N signals from the N stream beamformers 28. This process is performed one or more times per data burst. In one embodiment, the interference cancellation process is performed for each OFDM symbol in the data burst. In this case, for each symbol, weights are first calculated using measurements from the symbol before applying the weights to the same measurements and then feeding the interference cancelled measurements for the symbol to the N demodulators 32.

The process for calculating the interference cancellation weights, in an example, starts with taking the measurements from the N stream beamformers 28 and the M-N interference estimation beamformers 29 and selecting the subset of measurements with a-priori known modulation. This includes energised pilots and may include de-energised subcarriers.

From this subset of measurements, linear combinations of measurements of the energised pilots are formed which are designed to approximately null the component due to the energised pilots. In a simple example, consider two adjacent pilots with modulations $W1$ and $W1$ and measurements $M1$ and $M2$. A linear combination which approximately nulls the pilots is $M1 \times W2^* - M2 \times W1^*$ Other potential linear combinations which may be less susceptible to channel gain slops or delay offsets include $(M1/W1+M3/W)/2-M2/W2$ or $(M1/W1-M5/W)/2-(M2/W2-M4/W4)$ Added to this data set are the measurements of de-energised subcarriers if these are present and the new set of data is called the nulled pilots estimate.

A different null pilot estimate is required for each of the N interference cancellers that is constructed. Each of the N signals from the N stream beamformers 28 could have different pilot locations or modulations and different locations for de-energised subcarriers. For each of the N signals from 28, n, the associated nulled pilot estimate is used to form a least squares linear predictor of the nulled pilot estimate from 28 using the nulled pilot estimate from 29. The steps to forming the least squares linear predictors are, in an example, to calculate a covariance matrix, COV from the nulled pilot estimate from 29, the cross correlation vector P of the nulled pilot estimate from 29 and the nulled pilot estimate from 28, and the interference cancellation weights W=P/COV, complex vector of length M·N.

The interference cancellation weights W are then applied to measurements from 29. This estimates the interference present in the signal n from 28. It is subtracted from the signal n and the result, the n'th of the N interference cancelled signals, is provided to the N demodulators 32.

The N demodulators 32 perform demodulation of the N interference cancelled outputs from the N interference cancellation beamformers 31. Typically the demodulators will perform some type of channel estimation based on signals received from 31 every receive burst. This could be further updated every OFDM symbol when phase tracking pilots are present.

Orthogonality of two beams refers to a property of the complex weights used to form the two beams. Treating the weights associated with a given beam as a vector, orthogonality is when each beam has at least one non-zero complex weight and the complex dot product of the weights for the two beams is essentially zero.

Multipath associated with the wanted signal and interferer will typically result in variations of the channel estimate across the channel. To accommodate frequency dependency of the wanted or interferer channels, the N Interference cancellation beamformers implement in 31 may be specific to sub-bands of the occupied channel. In the case that an interference cancellation beamformer are sub-band specific then the null-pilot estimates used to calculate the weights would be taken from the same sub-band. In conditions when the interference spatial coherence time (a measure of how long the interference characteristics remain correlated in time) is many OFDM symbols then configuration options may trade off using a small number of adjacent nulled pilots consecutive over many consecutive OFDM symbols to form weights for an interference cancellation beamformer versus using more adjacent nulled pilots over fewer consecutive OFDM symbols. Effectively a trade-off can be made between tolerating shorted interference spatial coherence time vs smaller coherence bandwidth. Both can be achieved with a similar processing resource and pilot density. There will be a longer demodulation latency when using more OFDM symbols which will require more storage.

Figure 5:
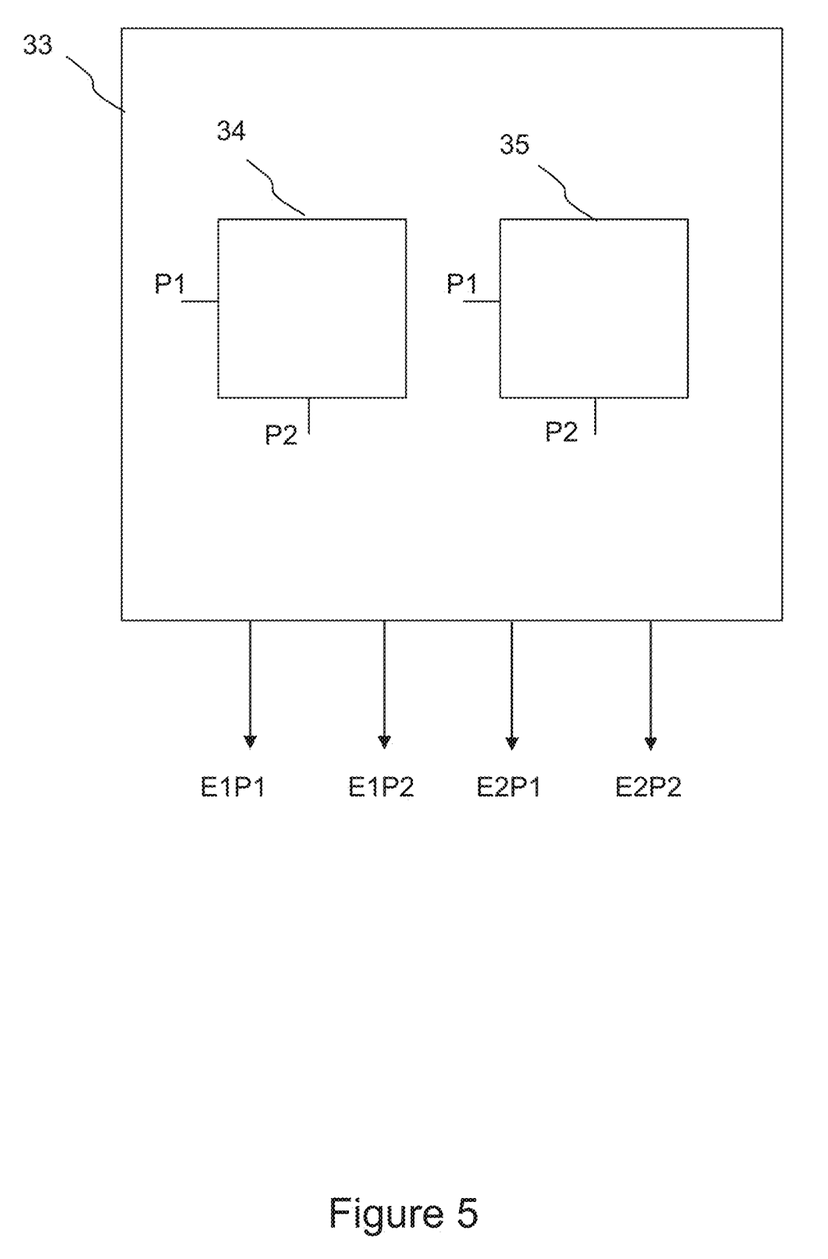
FIG. 5 is a schematic diagram illustrating a feed antenna arrangement comprising an array of two dual polar patch antenna elements.

As shown in FIG. 5, wherein the multi-element antenna array 33 may comprise a first dual-polar antenna element 34 and a second dual-polar antenna element 35 disposed as a row of only two antenna elements. The array may be disposed as a feed for a reflector of an antenna arrangement. In an example, the antenna array may consist of only the first and second dual-polar elements. Each column has a dual polar feed. The two columns allow single dual polar null steering in azimuth. This may be achieved at lower cost than would be required by providing the equivalent gain by using a multi-element array having more elements, but provides interference cancellation capabilities that may not be provided by the use of a single element feed.

Figure 6:
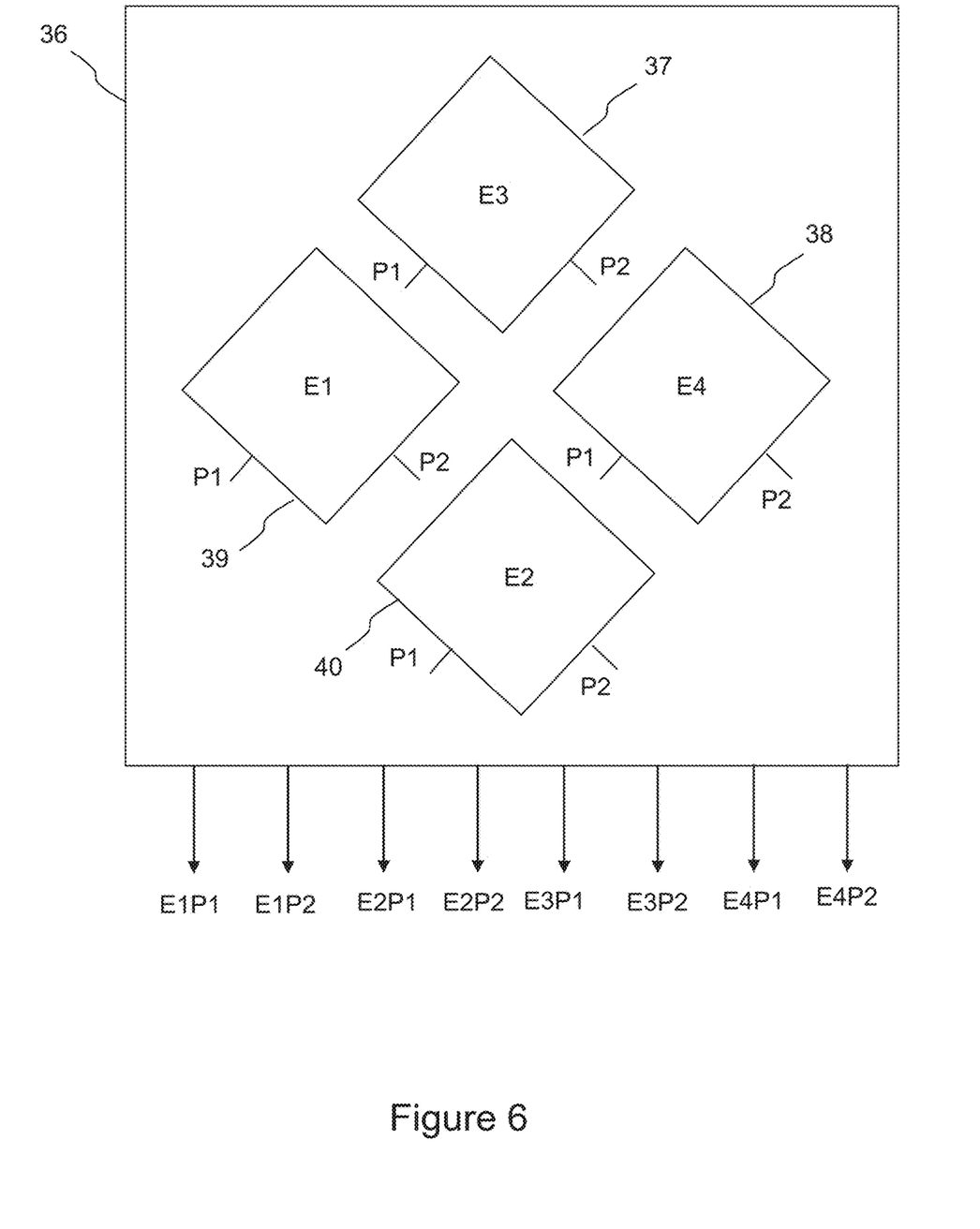
FIG. 6 is a schematic diagram illustrating a feed antenna arrangement comprising an array of four dual polar patch antenna elements.

In an alternative example, as shown in FIG. 6, the antenna array may comprise a third and fourth dual-polar antenna element 38, 40 disposed to form a second row of only two antenna elements, the second row being parallel to the row consisting of the first and second dual polar antenna elements 37, 39, wherein each row is configured to be disposed at an angle of 30-60 degrees from horizontal. In an example, the angle is substantially pi/4 radians. Each patch has dual polar feed. The rotation of the array rotated by 30-60, or 45 degrees provides the array with 3 phase centres in azimuth. The rotated array enables steering three dual polar nulls in azimuth. This provides increased interference cancellation capabilities while providing higher antenna gain than may be achieved by the multi-element array without a reflective antenna arrangement.

Figure 7:
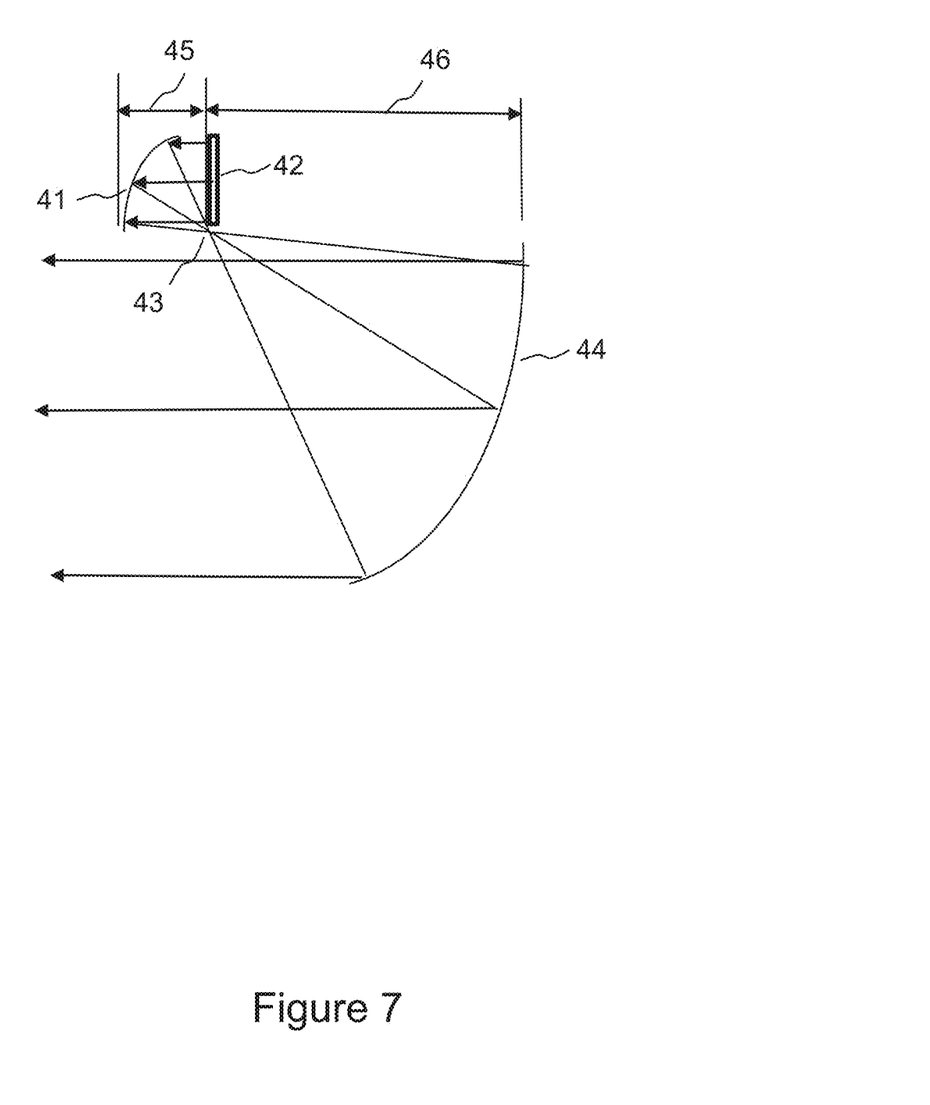
FIG. 7 is a schematic diagram illustrating a feed antenna arrangement in an offset Gregorian antenna.
Figure 8:
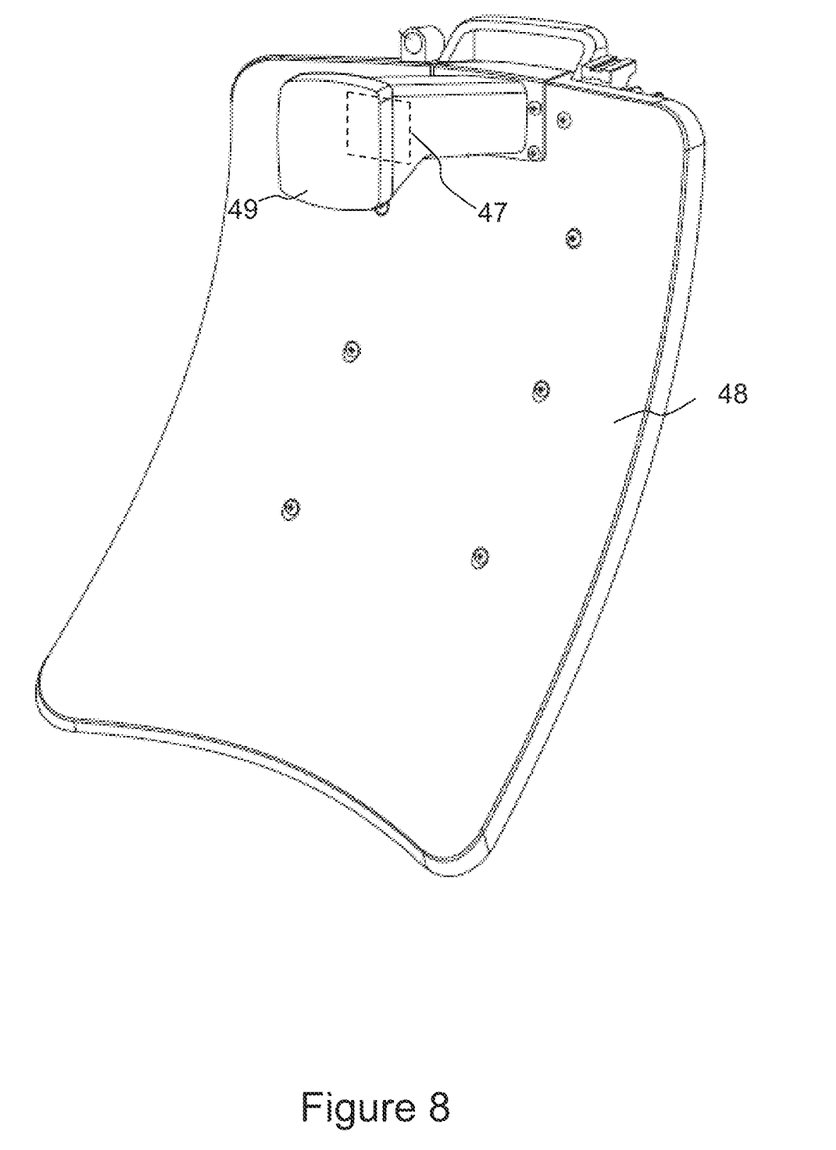
FIG. 8 shows a perspective view of an antenna arrangement in an example.

As shown in FIGS. 7 and 8, the antenna arrangement may be an offset Gregorian antenna arrangement and the feed is for a secondary reflector of the offset Gregorian antenna arrangement. FIG. 7 is feed antenna arrangement in an offset Gregorian antenna, having a multi-element array 42 as a feed, a secondary reflector 41 having a focal length 45, a primary reflector 44 having a focal length 46 and a focus 43. FIG. 8 shows a perspective view of an offset Gregorian antenna arrangement in an example, having a primary reflector 48 and a multi-element array 47 illuminating a secondary reflector (within radome 49).

Figure 9:
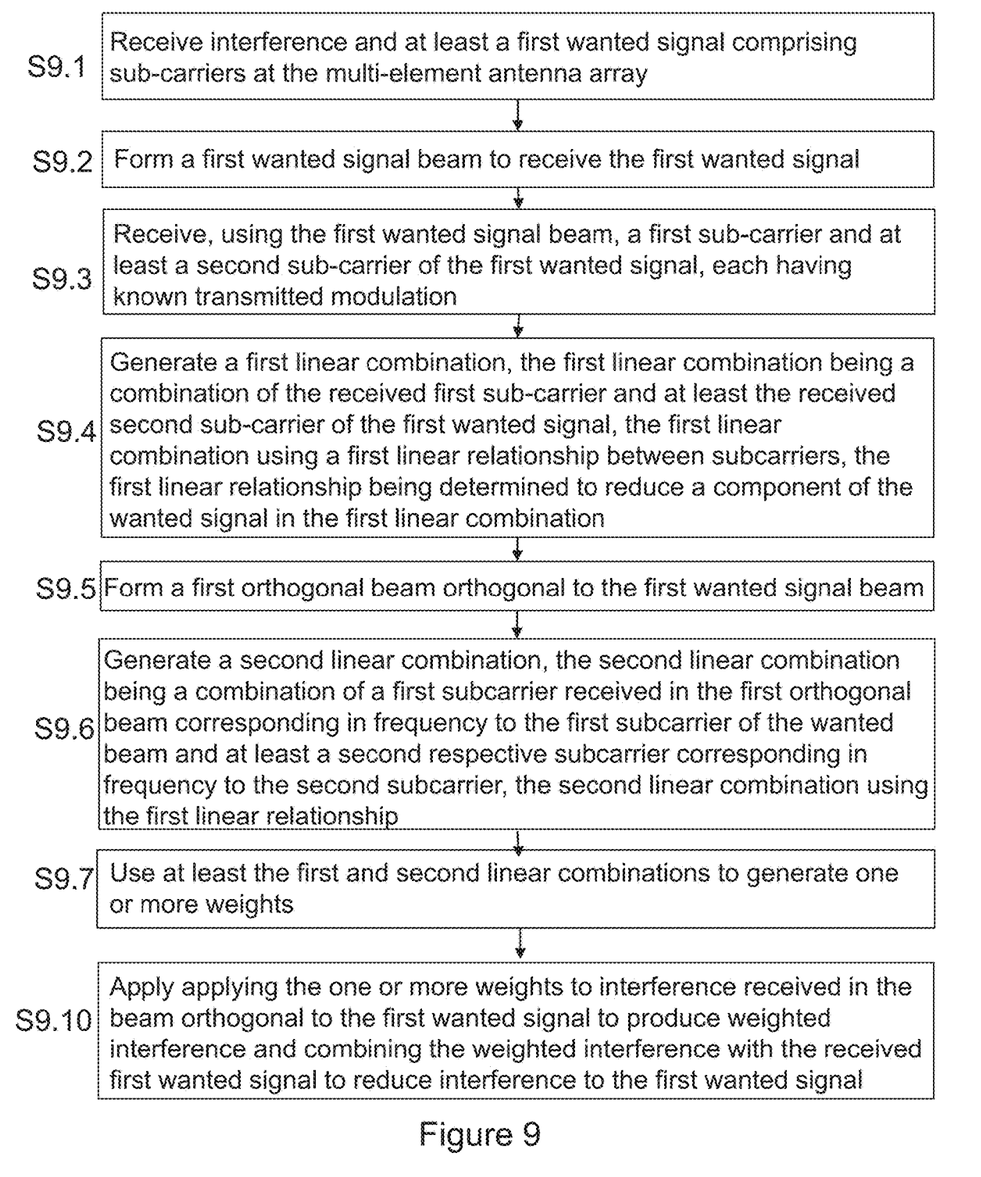
FIG. 9 is a flow diagram of a method in an example.

FIG. 9 is a flow diagram of a method in an example, according to steps S9.1 to S9.10.

Figure 10:
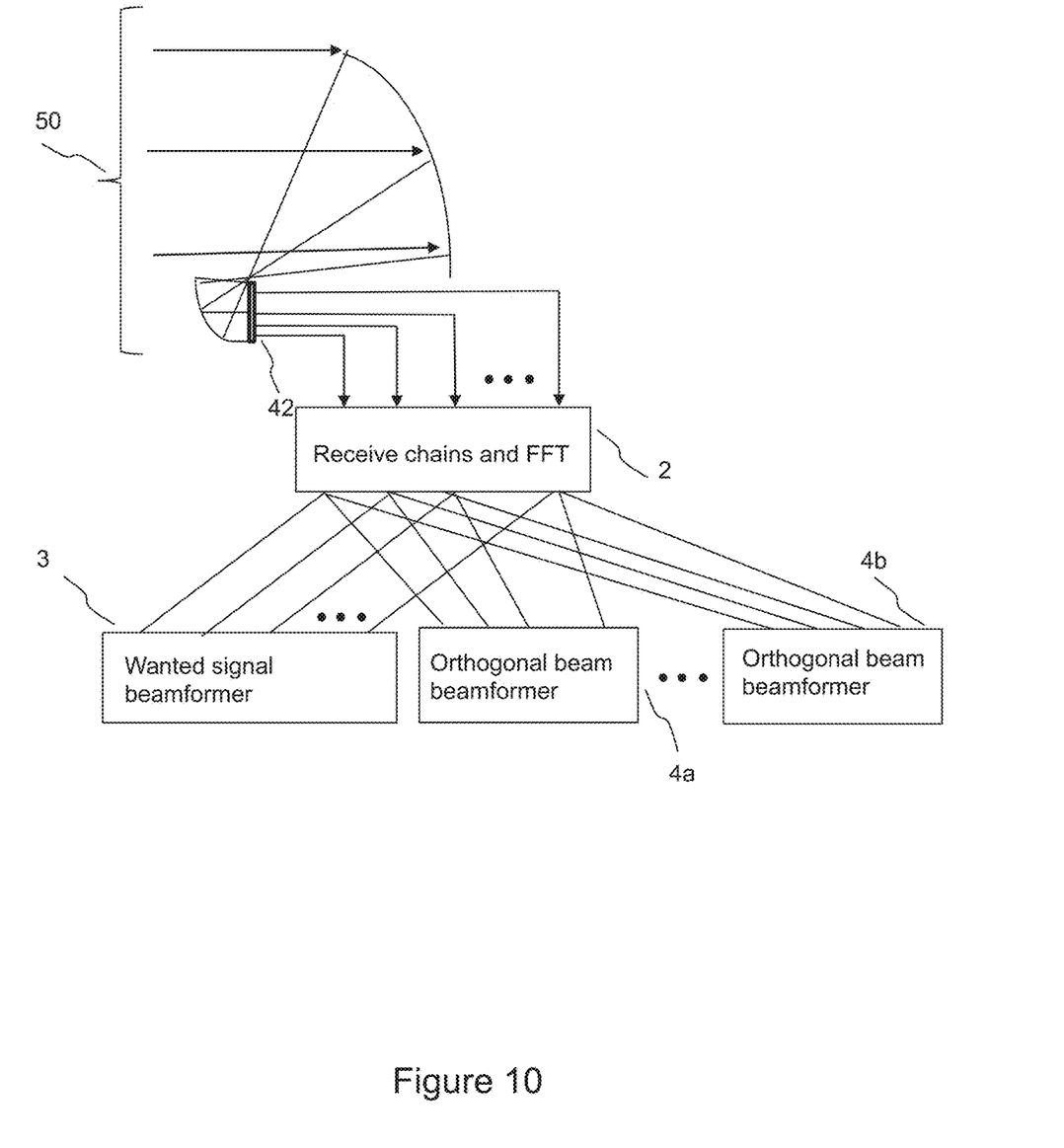
FIG. 10 is a schematic diagram showing a receiver architecture in an example, in which an array of antenna elements is configured as a feed for a offset Gregorian antenna arrangement.

FIG. 10 is a schematic diagram showing a receiver architecture in an example, in which an array of antenna elements 42 is configured as a feed for a reflector of an antenna arrangement 50, such as an offset Gregorian antenna arrangement, providing a method of improving signal to interference ratio at a wireless station in a fixed wireless access wireless communication network. The array of antenna elements 42 may comprise a first dual-polar antenna element 34 and a second dual-polar antenna element 35 disposed as a row of only two antenna elements, as shown in FIG. 5. The first dual-polar antenna element 34 has first and second outputs for signals received at orthogonal respective polarisations, and the second dual-polar antenna element 35 has third and fourth outputs for signals received at orthogonal respective polarisations.

Interference and at least a first wanted signal is received at the antenna arrangement. The interference and wanted signal received at each element is processed by receive chains and Fast Fourier Transform (FFT) 2, as already described.

First weights are applied to the outputs of the receive chains and FFT to form a first wanted signal beam to receive the first wanted signal, the outputs being signals derived from at least the first, second, third and fourth outputs from the dual polar antenna elements. The first weights may be determined on the basis of channel estimates of received wanted signals, as previously described.

Second weights are applied to the outputs of the receive chains and FFT to form one or more beams, orthogonal to the first wanted signal beam, which may be referred to as interference beams. The orthogonal beams may be determined from the channel estimates, for example using a Gram-Schmidt procedure, a modified Gram-Schmidt procedure or a QR decomposition as already mentioned.

Third weights are applied to signals received in the one or more interference beams and combining the weighted signals with the received signals in the wanted signal beam to reduce interference to the first wanted signal. The third weights may be calculated by a process comprising forming a least squares linear predictor of the estimate related to the interference component of a received component of the wanted signal using a corresponding component of signals received in the one or more interference beams. The estimate related to the interference component of a received component of the wanted signal may be based on the linear combination of signal components arranged to cancel or reduce the wanted signal as already described. Alternatively, the estimate related to the interference component of a received component of the wanted signal may be based on signals received at times and/or frequencies within the wanted signal format in which the wanted signal is known to be absent. For example, some subcarriers of OFDM symbols may not be energised. Because the wanted signal does not mask the interference, the interference signals can be processed effectively to produce the third weights.

The approach of reducing interference by generating a wanted signal beam and one or more orthogonal beams and combining these to cancel the interference is particularly suited to the use of an antenna array with a small number of antenna elements. Interference may be rejected by this approach in a more cost-effective manner than may be achieved simply by forming a wanted signal beam with nulls towards interference, as can be done conventionally by beamforming using a larger number of antenna elements.

In an example, the antenna array may consist of only the first and second dual-polar elements. This gives a particularly cost-effective implementation.

In an alternative, the antenna array may additionally comprise third and fourth dual-polar antenna elements disposed to form a second row of only two antenna elements, the second row being parallel to the row consisting of the first and second dual polar antenna elements. This may allow rejection of a greater number of interference sources at the cost of providing an array having more antenna elements. In this case, each row may be configured to be disposed at an angle of 30-60 degrees from horizontal, in an example the angle may be substantially pi/4 radians.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What I claim is:

1. A method of reducing interference at a wireless station comprising a multi-element antenna array, the method comprising:
    receiving interference and at least a first wanted signal comprising sub-carriers at the multi-element antenna array;
    forming a first wanted signal beam to receive the first wanted signal;
    receiving, using the first wanted signal beam, a first sub-carrier and at least a second sub-carrier of the first wanted signal, each having known transmitted modulation;
    generating a first linear combination, the first linear combination being a combination of the received first sub-carrier and at least the received second sub-carrier of the first wanted signal, the first linear combination using a first linear relationship between subcarriers, the first linear relationship being determined to reduce a component of the wanted signal in the first linear combination;
    forming a first orthogonal beam orthogonal to the first wanted signal beam;
    generating a second linear combination, the second linear combination being a combination of a first subcarrier received in the first orthogonal beam corresponding in frequency to the first subcarrier of the first wanted signal and at least a second respective subcarrier received in the first orthogonal beam corresponding in frequency to the second subcarrier of the first wanted signal, the second linear combination using the first linear relationship;
    processing at least the first and second linear combinations to generate one or more weights; and
    applying the one or more weights to interference received in the beam orthogonal to the first wanted signal to produce weighted interference and combining the weighted interference with the received first wanted signal to reduce interference to the first wanted signal.

2. The method of claim 1, comprising generating the first linear combination of the received first sub-carrier and at least the received second sub-carrier by normalisation of the first and at least the second received sub-carriers with respect to the known respective transmitted modulation.

3. The method of claim 2, comprising generating the first linear combination of the received first sub-carrier and at least the received second sub-carrier by subtracting a linear combination of the normalised second and at least a normalised third received sub-carrier from the normalised first received subcarrier.

4. The method of claim 1, comprising generating the one or more weights by a process comprising forming a least squares linear predictor of the first linear combination using the second linear combination.

5. The method of claim 4, wherein the method comprises forming a plurality of beams orthogonal to the first wanted signal beam and wherein forming the least squares linear predictor comprises:
    forming a covariance matrix from linear combinations having the first linear relationship of components comprising received interference components of the signals received in the plurality of beams orthogonal to the first wanted signal beam corresponding to the first subcarrier;
    forming a cross-correlation vector of the linear combinations of the interference component of the received first subcarrier and the corresponding linear combinations of received interference components of the signals received in the plurality of beams orthogonal to the first wanted signal beam; and
    dividing the cross-correlation vector by the covariance matrix.

6. The method of claim 5, comprising forming the first wanted signal beam from channel estimates derived from a plurality of sounding operations which are processed to remove or de-weight measurements which deviate from an expected result.

7. The method of claim 6, comprising forming the plurality of beams orthogonal to the first wanted beam by a process comprising using the channel estimates.

8. The method of claim 7, wherein forming orthogonal beams to the first wanted signal beam or a plurality of wanted signal beams comprises a method selected from a Gram-Schmidt procedure, a modified Gram-Schmidt procedure and QR decomposition.

9. The method of claim 1, wherein the first wanted signal is an Orthogonal Frequency Division Modulation OFDM signal and the first sub-carrier and at least the second sub-carrier are pilot tones of the OFDM signal having known transmitted amplitude and phase modulation.

10. The method of claim 1, wherein the multi-element antenna array comprises a first dual-polar antenna element and a second dual-polar antenna element disposed as a row of only two antenna elements,
  wherein the array of antenna elements is disposed as a feed for a reflector of an antenna arrangement.

11. The method of claim 10, wherein the antenna array consists of only the first and second dual-polar elements.

12. The method of claim 10, wherein the antenna array comprises a third and fourth dual-polar antenna element disposed to form a second row of only two antenna elements, the second row being parallel to the row consisting of the first and second dual polar antenna elements, wherein each row is configured to be disposed at an angle of 30-60 degrees from horizontal.

13. The method of claim 10, wherein the antenna arrangement is an offset Gregorian antenna arrangement and the feed is for a secondary reflector of the offset Gregorian antenna arrangement.

14. A non-transitory storage medium carrying instructions, which, when executed by one or more processors, cause a wireless station to perform the method of claim 1.

15. A wireless station comprising:
  a multi-element antenna array; and
  one or processors configured to cause the wireless station to reduce interference at a wireless station comprising a multi-element antenna array, by:
  receiving interference and at least a first wanted signal comprising sub-carriers at the multi-element antenna array;
  forming a first wanted signal beam to receive the first wanted signal;
  receiving, using the first wanted signal beam, a first sub-carrier and at least a second sub-carrier of the first wanted signal, each having known transmitted modulation;
  generating a first linear combination, the first linear combination being a combination of the received first sub-carrier and at least the received second sub-carrier of the first wanted signal, the first linear combination using a first linear relationship between subcarriers, the first linear relationship being determined to reduce a component of the wanted signal in the first linear combination;
  forming a first orthogonal beam orthogonal to the first wanted signal beam;
  generating a second linear combination, the second linear combination being a combination of a first subcarrier received in the first orthogonal beam corresponding in frequency to the first subcarrier of the first wanted signal and at least a second respective subcarrier received in the first orthogonal beam corresponding in frequency to the second subcarrier of the first wanted signal, the second linear combination using the first linear relationship;
  processing at least the first and second linear combinations to generate one or more weights; and
  applying the one or more weights to interference received in the beam orthogonal to the first wanted signal to produce weighted interference and combining the weighted interference with the received first wanted signal to reduce interference to the first wanted signal.

16. The wireless station of claim 15, wherein the multi-element antenna array comprises a first dual-polar antenna element and a second dual-polar antenna element disposed as a row of only two antenna elements, wherein the array of antenna elements is disposed as a feed for a reflector of an antenna arrangement.

17. The wireless station of claim 16, wherein the antenna array consists of only the first and second dual-polar elements.

18. The wireless station of claim 16 wherein the antenna array comprises a third and fourth dual-polar antenna elements disposed to form a second row of only two antenna elements, the second row being parallel to the row consisting of the first and second dual polar antenna elements.

19. The wireless station of claim 18, wherein each row is configured to be disposed at an angle of 30-60 degrees from horizontal.

20. The wireless station of claim 15, wherein the antenna arrangement is an offset Gregorian antenna arrangement and the feed is for a secondary reflector of the offset Gregorian antenna arrangement.

* * * * *